United States Patent
Vandermeijden (12)

(10) Patent No.: US 7,143,043 B1
(45) Date of Patent: Nov. 28, 2006

(54) CONSTRAINED KEYBOARD DISAMBIGUATION USING VOICE RECOGNITION

(75) Inventor: Tom R. Vandermeijden, Pacifica, CA (US)

(73) Assignee: Openwave Systems Inc., Redwood City, CA (US)

( * ) Notice: Subject to any disclaimer, the term of this patent is extended or adjusted under 35 U.S.C. 154(b) by 0 days.

(21) Appl. No.: 09/558,900

(22) Filed: Apr. 26, 2000

(51) Int. Cl.
*G10L 15/00* (2006.01)

(52) U.S. Cl. ............... 704/275; 379/88.01; 341/22
(58) Field of Classification Search .......... 704/275, 704/246, 270, 271; 379/88.01, 93.27; 341/22
See application file for complete search history.

(56) References Cited

U.S. PATENT DOCUMENTS

| | | | |
|---|---|---|---|
| 5,131,045 A * | 7/1992 | Roth | 704/275 |
| 5,337,346 A * | 8/1994 | Uchikara | 379/58 |
| 5,392,338 A * | 2/1995 | Danish et al. | 379/97 |
| 5,809,415 A | 9/1998 | Rossmann | |
| 5,911,485 A | 6/1999 | Rossmann | |
| 5,917,889 A | 6/1999 | Brotman et al. | |
| 5,917,890 A * | 6/1999 | Brotman et al. | 704/275 |
| 6,209,009 B1 | 3/2001 | Schwartz et al. | |
| 6,346,894 B1 * | 2/2002 | Connoly et al. | 704/271 |
| 6,401,065 B1 * | 6/2002 | Kanevsky et al. | 704/256 |
| 6,734,881 B1 * | 5/2004 | Will | 715/811 |

OTHER PUBLICATIONS

"UP.Browser™ User Handbook", Unwired Planet, Inc., Nov. 1997.

* cited by examiner

*Primary Examiner*—Daniel Abebe
(74) *Attorney, Agent, or Firm*—Townsend and Townsend and Crew LLP

(57) ABSTRACT

An improved approach for resolving overloaded keys (i.e., ambiguous keys) in constrained data entry computing systems is disclosed. A combination of an ambiguous key entry and a corresponding voice input are used to particularly identify an entered key. Examples, of constrained data entry computing systems include palm-sized computers, mobile phones (including cellular), Portable Digital Assistants (PDAs), Internet appliances, etc.

25 Claims, 7 Drawing Sheets

CONSTRAINED KEYBOARD DISAMBIGUATION USING VOICE RECOGNITION

BACKGROUND OF THE INVENTION

1. Field of the Invention

The present invention relates to computing devices and, more particularly, to recognition of user input by constrained computing devices.

2. Description of the Related Art

Today, various types of wireless communication devices are available. Examples of wireless communication devices include pagers, mobile phones, Personal Digital Assistants (PDAs), palm-top computers, and electronic schedulers. In using wireless communication devices, there is often a need to enter text information. Conventionally, wireless communication devices have a keyboard or keypad that allow users of the wireless communication devices to enter text information. Unfortunately, given the reduced size of wireless communication devices, the size of their keyboards or keypads are limited (or constrained).

Many wireless communication devices, such as mobile phones, use a standard 12 key telephone-type keypad for entering numeric or text data. However, with only 12 keys, many of the keys have to represent multiple characters. As a result, each key press is ambiguous as to the character to be entered. For example, in one case, entering the "8" key, ambiguously refers to one of "8", "T", "U" or "V". Various conventional techniques have been used to disambiguate the character being entered through multiple key presses. As an example, after the initial key press, the user is presented with a list of choices on a display screen and then the desired character is selected from the displayed list using additional key presses. The list of choices can be order based on their likelihood of appropriateness given the previous character. Nevertheless, this approach not only requires multiple key presses but also requires the user to focus attention onto a display screen. As another example, after the initial key presses for the characters of a word have been entered, a built-in dictionary can be consulted to disambiguate the word the user is attempting to enter. This approach requires the user to know the correct spelling for the word and requires the dictionary to support the desired word. This approach is also unreliable for short words.

Thus, there is a need for improved techniques to disambiguate key entries for constrained keyboards.

SUMMARY OF THE INVENTION

Broadly speaking, the invention relates to an improved approach for resolving overloaded keys (i.e., ambiguous keys) in constrained computing devices, such as palm-sized computers, mobile phones (including cellular), Portable Digital Assistants (PDAs), Internet appliances, etc. The invention utilizes a combination of an ambiguous key entry and a corresponding voice input to particularly identify an entered key. The invention is particularly suited for mobile communication devices.

The invention can be implemented in numerous ways including, a method, system, device, and a computer readable medium. Several embodiments of the invention are discussed below.

As a method for inputting data to a mobile communication device having a constrained keyboard with ambiguous keys, the mobile communication device also having a microphone for picking up voice input, one embodiment of the invention includes the acts of: receiving voice input from a user using the microphone; detecting whether at least one of the ambiguous keys of the keyboard has been selected as a selected key; obtaining reference patterns associated with the selected key; comparing the voice input with the obtained reference patterns to produce comparison data; and identifying a character that was intended to be input by the user based on the comparison data.

As a computer readable medium having program code for disambiguating a key selection to a constrained input keyboard of a computing device, the key selection being ambiguous as to which a plurality of characters is to be input, one embodiment of the invention includes: program code for detecting whether an ambiguous keys of the keyboard has been selected as a selected key; program code for receiving a voice input corresponding to one of the characters associated with the selected key; and program code for determining the one of the characters to that has been input based on the selected key and the voice input.

As a key disambiguate system for an ambiguous key input device having a plurality of keys, with each key representing a plurality of different characters, one embodiment of the invention utilizes an improvement in which a user's key input of a single action on a single one of the keys is completely disambiguating through use of a user's sound input pertaining to an intended character associated with the single one of the keys.

As a key disambiguation system, one embodiment of the invention includes: a microphone, an analog-to-digital converter coupled to the microphone, a data reduction unit coupled to the analog-to-digital circuit, an ambiguous key input device having a plurality of keys, a keyboard controller coupled to the ambiguous key input device, a reference sound patterns source coupled to the keyboard controller, a pattern comparison unit coupled to the data reduction unit and the reference sound patterns source, and a key determination unit coupled to the pattern comparison unit. The microphone picks-up an analog voice input. The analog-to-digital microphone converts the analog voice input to a digital voice input. The data reduction unit identifies distinguishing characteristics within the digital voice input as processed voice input. Each of the keys of the ambiguous key input device represent a plurality of different characters. The keyboard controller detects a user's selection of one of the keys of the ambiguous key input device and invokes a key selection event. The reference sound patterns source stores a plurality of sound patterns. The pattern comparison unit compares the processed voice input with selected ones of the reference sound patterns to produce comparison data. The key determination unit determines the one of the characters being input based on the comparison data.

As a mobile communication device having a constrained keyboard with ambiguous keys, one embodiment of the invention includes: a microphone configured to receive voice input from a user; means for detecting whether at least one of the ambiguous keys of the keyboard has been selected as a selected key; means for obtaining reference patterns associated with the selected key; means for comparing the voice input with the obtained reference patterns to produce comparison data; and means for identifying a character that was intended to be input by the user based on the comparison.

The advantages of the invention are numerous. Different embodiments or implementations may yield one or more of the following advantages. One advantage of the invention is that voice recognition is used in conjunction with key entries to disambiguate an otherwise ambiguous key entries.

Another advantage of the invention is that voice recognition is able to be constrained so that the limited resources of constrained computing devices are sufficient. Still another advantage of the invention is that it is not limited to entering text for words but is applicable to any character entries. Yet another advantage of the invention is that a user need not focus on a display screen to enter characters.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention pertains to an improved approach for resolving overloaded keys (i.e., ambiguous keys) in constrained data entry computing systems, such as palm-sized computers, mobile phones (including cellular), Portable Digital Assistants (PDAs), Internet appliances, etc. The invention utilizes a combination of an ambiguous key entry and a corresponding voice input to particularly identify an entered key.

Constrained computing devices typically have data entry constraints and processing constraints. The data entry constraints are typically due to constrained key entry in which each key is ambiguous because it represents a plurality of different characters. The processing constraints are due to the limited processing resources associated with constrained computing devices, namely, limited processing power and memory. However, the invention is able to perform voice recognition on such constrained computing devices by limiting the complexity of the voice recognition to be performed. Hence, according to the invention, a constrained computing device can receive a single, ambiguous key selection for a particular character that a user desires to input and then reliably disambiguate the ambiguous key selection using the limited voice recognition capabilities. Alternatively, it can be said that the constrained computing device can utilized a key selection to reliably disambiguate a voice recognition.

Embodiments of this aspect of the invention are discussed below with reference to FIGS. 1–5. However, those skilled in the art will readily appreciate that the detailed description given herein with respect to these figures is for explanatory purposes as the invention extends beyond these limited embodiments.

Figure 1:
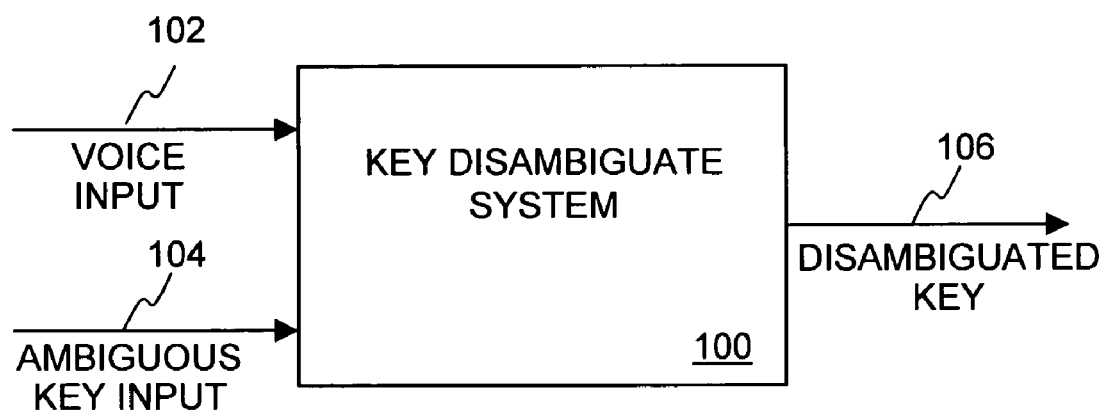
FIG. 1 illustrates a key disambiguate system according to a basic embodiment of the invention.

FIG. 1 illustrates a key disambiguate system 100 according to a basic embodiment of the invention. The key disambiguate system 100 receives a voice input 102 and an ambiguous key input 104. The voice input 102 and the ambiguous key input 104 are provided by a user. Typically, the ambiguous key input 104 results from the user pressing a key have a plurality of characters associated therewith. The key disambiguate system 100 operates to produce a disambiguated key 106 that represents the particular character that the user intended to input when the ambiguous key input 104 was pressed. Hence, the key disambiguate system 100 produces the disambiguated key 106 by using a combination of a key entry and voice recognition.

In one embodiment, the user vocalizes the particular character intended to be entered while the user presses the key on a keyboard (or keypad). The voice resignation performed by the key disambiguate system 100 is rather conventional and can be unsophisticated because the voice recognition need only disambiguate the ambiguous key input 104 from a few different characters associated with the key. For example, in an embodiment using a typical telephone type keyboard (or keypad), the voice resignation would only to disambiguate between at most five characters. In addition, the reliability of the voice resignation improves because only a small vocabulary of characters need be considered. In other embodiments, the user can vocalize the particular key that the user intends to input (entered) before, during, or after the user's press of the key on the keyboard (or keypad).

Figure 2:
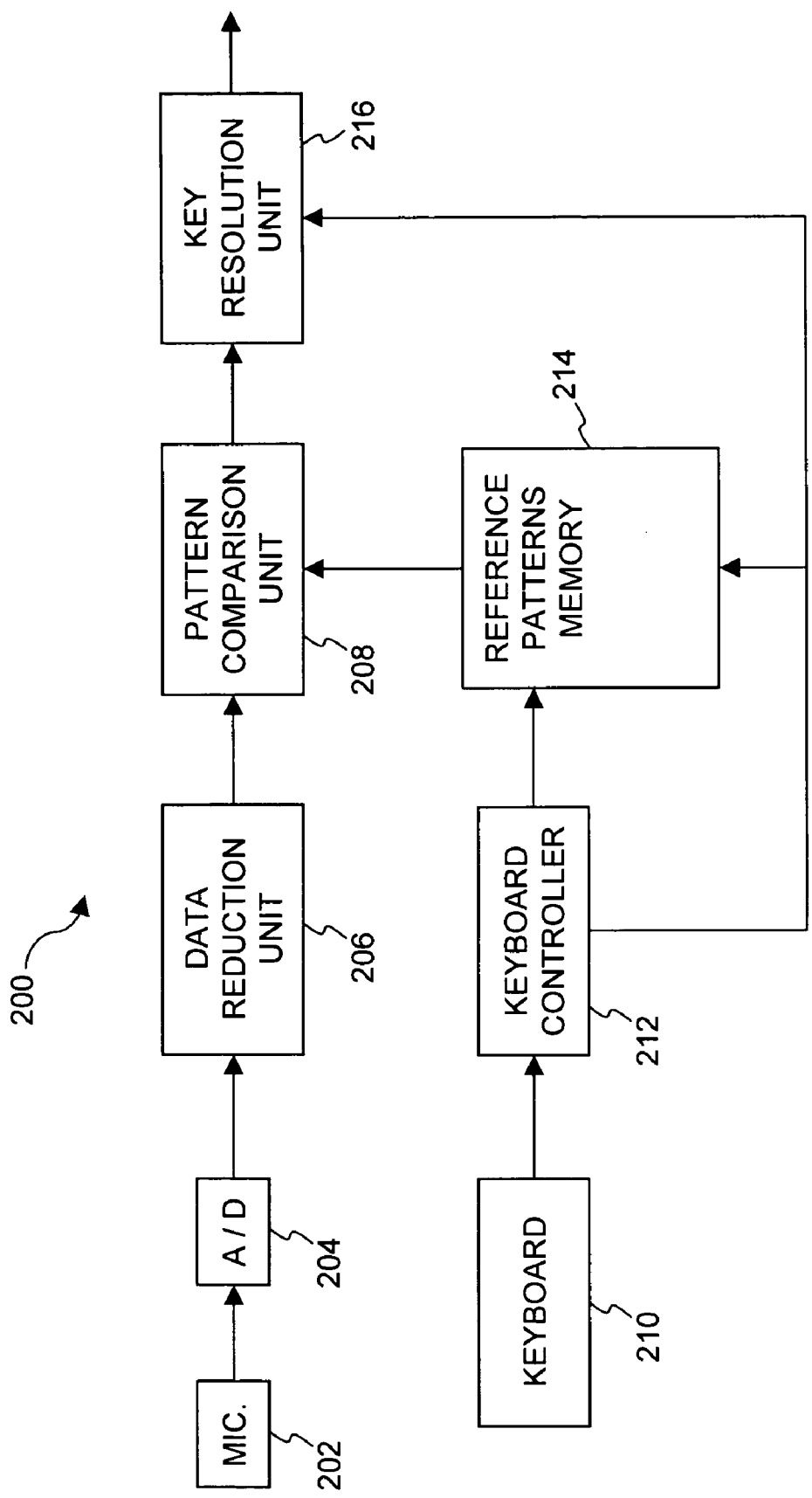
FIG. 2 is a block diagram of a key disambiguate system according to one embodiment of the invention.

FIG. 2 is a block diagram of a key disambiguate system 200 according to one embodiment of the invention. The key disambiguate system 200 is typically part of a larger system requiring user input, such as a computing device. The key disambiguate system 200 can, for example, represent an embodiment of the key disambiguate system 100 shown in FIG. 1.

The key disambiguate system 200 includes a microphone 202 that receives a voice input from a user. The voice input is received at the microphone 202 in an analog form. An analog-to-digital converter (A/D) 204 converts the analog input signal into a digital format. Then, at a data reduction unit 206, the voice input is spectrally analyzed to identify distinguishing features in the voice input. The resulting condensed data is then supplied from the data reduction unit 206 to a pattern comparison unit 208. In one embodiment, the pattern comparison unit 208 includes a circular buffer that stores the condensed data from the data reduction unit 206. For example, the circular queue within the pattern comparison unit 208 can store the most recent one-half second of voice input data.

The key disambiguation system 200 also includes a keyboard 210. A user can interact with a keyboard 210 to enter characters to be processed by the key disambiguation system 200. The keyboard 210 has a limited or constrained size due to size and space limitations of its application. As examples, the application pertain to palm-sized computers, mobile phones (including cellular), PDAs, Internet appliances, etc. As a result, the keyboard 210 has a plurality of keys but many of the keys represent more then one character. For example, as noted above, a typical telephone keypad assigns multiple letters to individual keys as shown see Table I below.

TABLE I

| Key | Exemplary Possible Interpretations of Key | | | |
|---|---|---|---|---|
| 1 | | | | |
| 2 | A | B | C | |
| 3 | D | E | F | |
| 4 | G | H | I | |
| 5 | J | K | L | |
| 6 | M | N | O | |
| 7 | P | Q | R | S |
| 8 | T | U | V | |
| 9 | W | X | Y | Z |
| 0 | | | | |
| * | | | | |
| # | | | | |

Hence, a single key press is unable to identify a particular character (A–Z) being input, instead only a group of characters can be identified with the single key press. As indicated, the characters associated with a key can includes letters as well as numbers.

In a typical telephone keypad, there are ten keys to represent numeric values zero through nine. In addition, these same ten keys are also used to represent multiple letters so that a user can enter words. However, with conventional techniques, it has been cumbersome and difficult for users to enter the alphabetical characters using the telephone key pad because multiple presses of keys are needed to disambiguate a single character. Further, the devices using the limited or constrained keyboards are also often small sized computing devices that have limited processing capability and memory resources as compared to typical desktop computer systems. Hence, these small scale computing devices do not have the resources to implemented complicated voice resignation techniques, thus making the unsophisticated voice recognition approaches required by the invention particularly useful.

Once a key has been pressed on the keyboard 210, a keyboard controller 212 receives the selected key. The keyboard controller 212 forwards the selected key to a reference patterns memory 214. In addition, the keyboard controller 212 issues a keyboard event once the selected key is detected. The keyboard event is supplied to the reference patterns memory 214 as well as to a key resolution unit 216. The reference patterns memory 214 includes reference patterns, namely, reference sound patterns for the characters (e.g., letters) associated with the keys of the keyboard. The selected key is used by the reference pattern memory 214 to identify a subset of the reference patterns that pertain to the characters that correspond to the selected key. The subset of the reference patterns are then made available to the pattern comparison unit 208. For example, if the selected key is "8", then the subset of reference patterns would pertain to the sound patterns for the letters "T", "U" and "V" and perhaps also the number "8".

The pattern comparison unit 208 compares the selected reference patterns within the subset of the reference patterns to the condensed data stored in the circular queue. The pattern comparison unit 208 outputs correlation information (or match information) to the key resolution unit 216. Typically, the key resolution unit 216 includes a circular buffer for storage of the correlation information from the pattern comparison unit 208. Hence, as voice inputs are received and eventually compared with selected reference patterns at the pattern comparison unit 208, the resulting correlation information is stored in the circular buffer of the key resolution unit 216. Hence, the circular queue stores entries for a series of the voice inputs, for example, for the last 1 second of voice inputs (audio stream). The key selection event that is supplied to the key resolution unit 216 is used to indicate the moment of interest in the audio stream for the resolution or the disambiguation of the selected key. In other words, the key selection event indicates the most important entries in the circular buffer of the key resolution unit 216. If the correlation for the most important entry is high enough, then the character associated with chosen correlation information is the disambiguated character. If the correlation for the most important entry is not high enough other nearby entries in the circular queue can be examined. Accordingly, to the extent that a sufficient correlation can be found, the key resolution unit 216 outputs an indication of the character associated with the selected key that the user intended to input by the single depression of the selected key.

Figure 3:
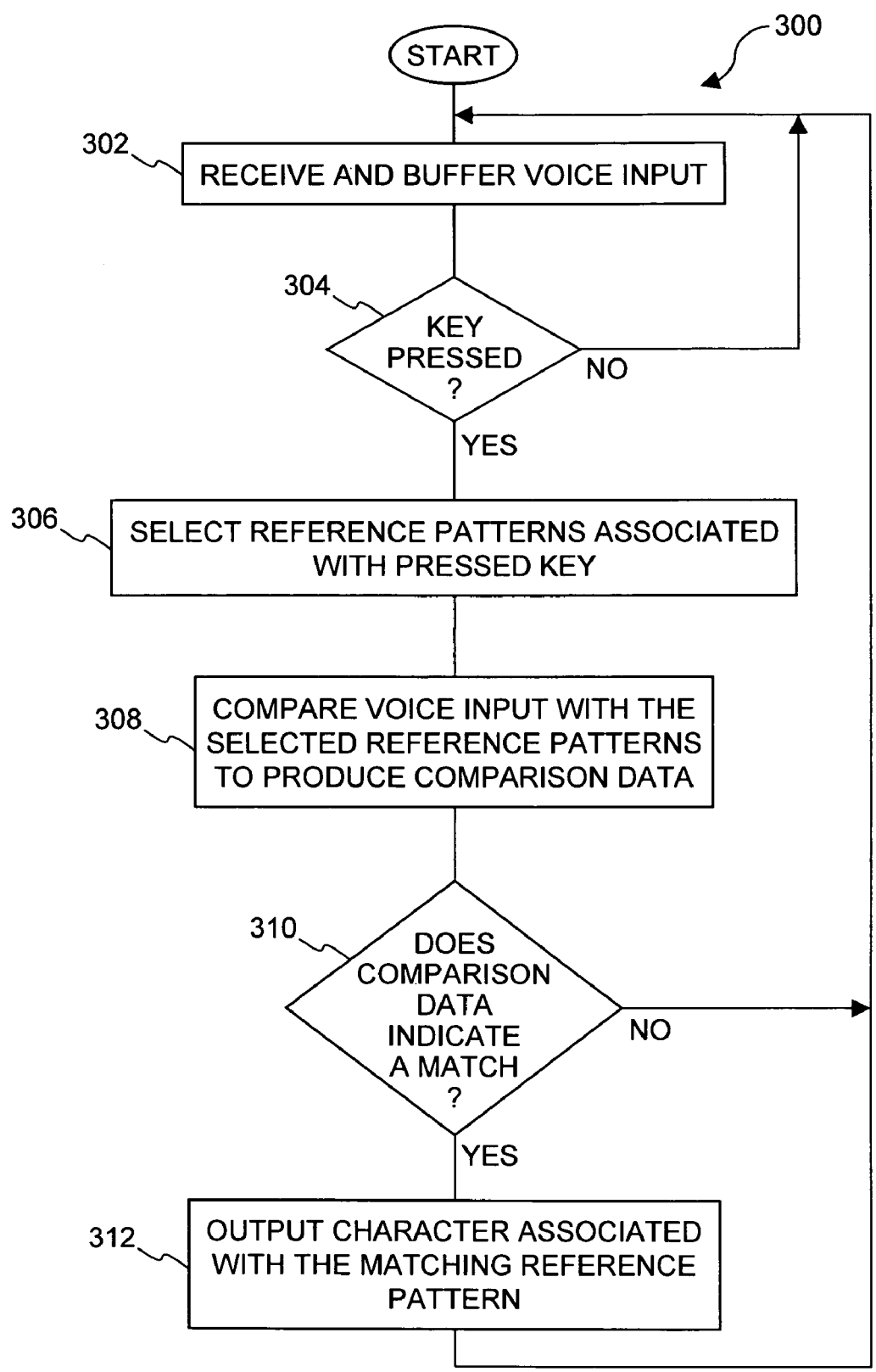
FIG. 3 is a flow diagram of key input processing according to one embodiment of the invention.

FIG. 3 is a flow diagram of key input processing 300 according to one embodiment of the invention. The key input processing 300 receives 302 a voice input and places it in a buffer. Next, a decision 304 determines whether a key has been pressed. Although not a limitation of the invention, the voice input should in this embodiment be completed before the key is pressed by the user. Here, the decision 304 determines whether a key of a keyboard has been pressed by a user. When the decision 304 determines that a key has not been pressed, the key input processing 300 returns to repeat block 302. On the other hand, once the decision 304 determines that a key has been pressed, then reference patterns associated with the pressed key are selected 306. Next, the voice input that was stored 302 in the buffer is compared 308 with the selected referenced patterns to produced comparison data. The comparison data can, for example, indicate a correlation or a match between the voice input and the selected reference patterns. Then, a decision 310 determines whether the comparison data indicates a match. Here, the decision 310 determines whether there is a match between the voice input and one of the selected referenced patterns. When the decision 310 determines that there is a match, then the character associated with the matching referenced pattern is output 312. Following output 312 of the character, the key input processing 300 is complete for the pressed key with the character that the user intended to output being identified. Alternatively, when the decision 310 determines that there is no match between the voice input and the selected referenced patterns, then the key input processing 300 is complete for the pressed key, though no character is identified as being input by the user. Once the key input processing 300 has completed the processing for the pressed key, the processing repeats for subsequent pressed keys (and voice inputs).

Figure 4A:
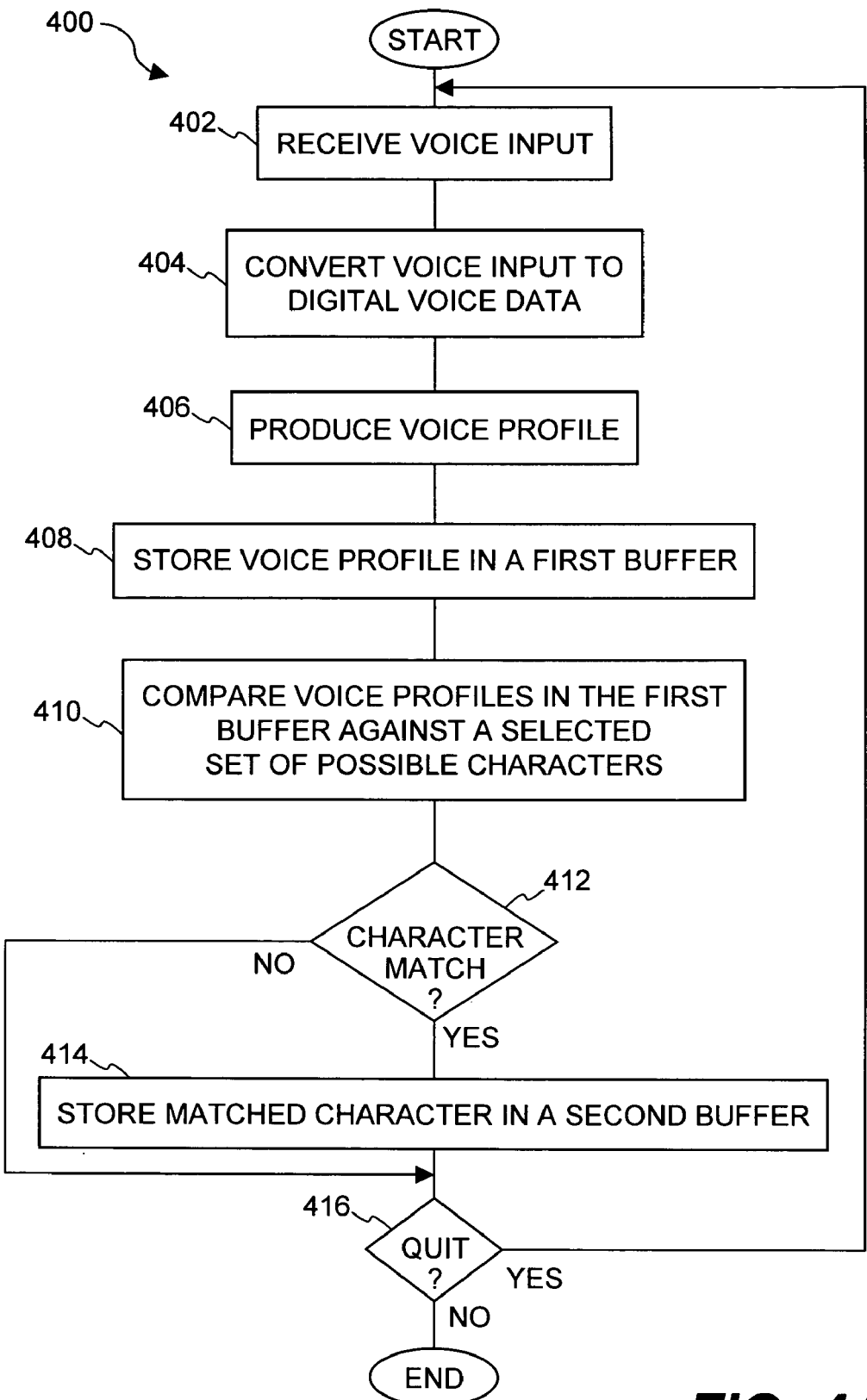
FIG. 4A is a flow diagram of key input processing according to one embodiment of the invention.

FIG. 4A is a flow diagram of key input processing 400 according to one embodiment of the invention. The key input processing 400 initially receives 402 a voice input. Then, the voice input is converted 404 to digital voice data. Next, a voice profile is produced 406 from the digital voice data. The voice profile is then stored 408 in a first buffer.

Next, the voice profiles stored in the first buffer are compared 410 against a selected set of possible characters (reference patterns). A decision 412 then determines whether there is a character match. When the decision 412 determines that there is a character match between one of the voice profiles and the selected set of possible characters, then the matched characters are stored 414 in a second buffer. Here, the matched characters are prospective disambiguated keys. Thereafter, a decision 416 determines whether the key input processing 400 should quit. When the decision 416 determines that the key input processing should not quit, then the key input processing 400 returns to repeat block 402 and subsequent blocks. Alternatively, when the decision 416 determines that the key input processing 400 should quit, then the key input processing 400 is complete and ends. On the other hand, when the decision 412 determines that there is no character match following the comparison of the voice profiles with the selected set of possible characters, then block 414 is bypassed (or a no match indication stored in the second buffer) and the decision 416 is similarly processed.

Figure 4B:
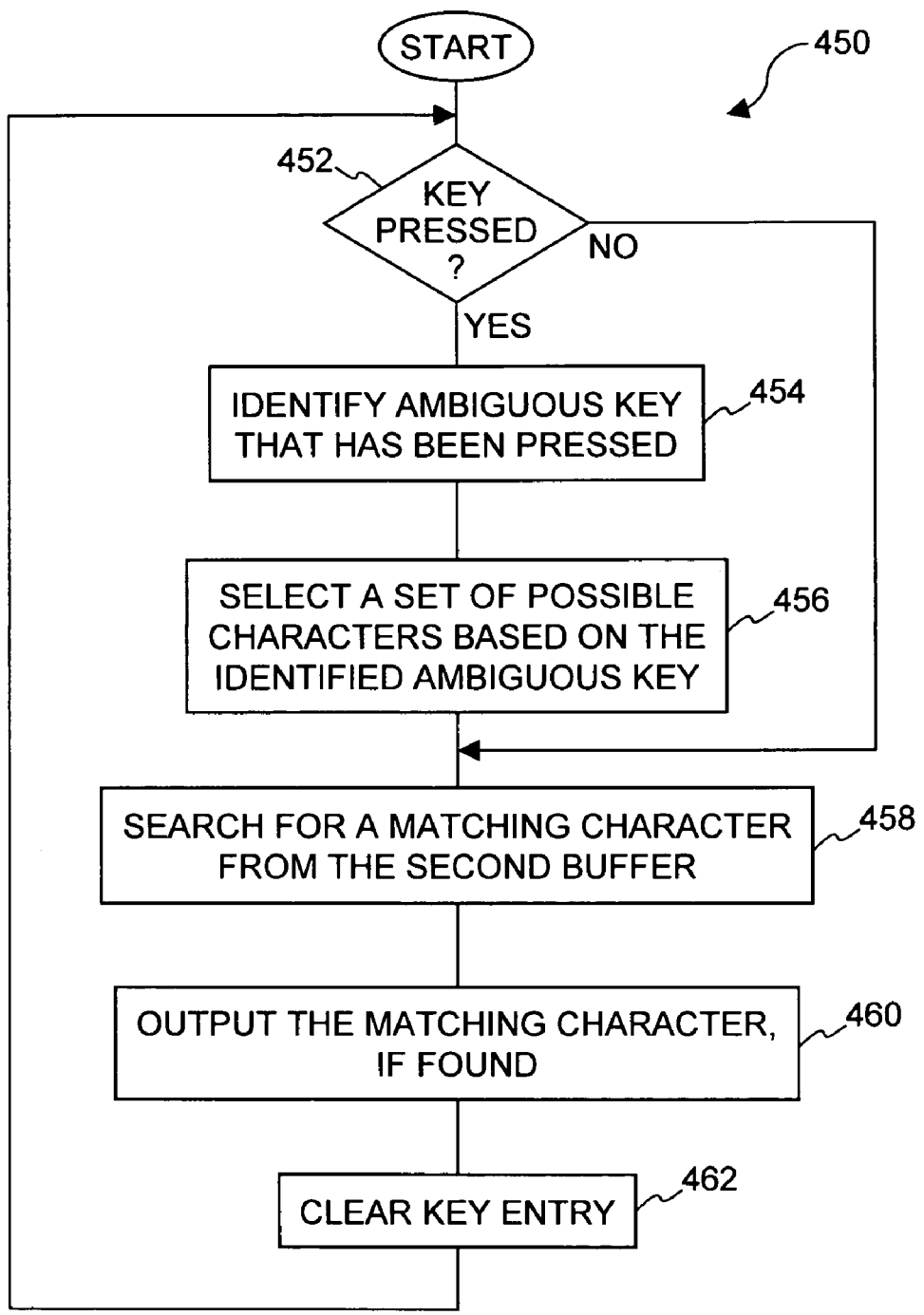
FIG. 4B is a flow diagram of key selection processing according to one embodiment of the invention.

FIG. 4B is a flow diagram of key selection processing 450 according to one embodiment of the invention. The key selection processing 450 continuously operates to receive and process key inputs. A decision 452 determines whether a key (i.e., ambiguous key) has been pressed by a user. When the decision 452 determines that a key has been pressed, then the ambiguous key that has been pressed is identified 454. The key that has been pressed is ambiguous because it is associated with a plurality of different characters. The key selection processing 450 is used to disambiguate the ambiguous key and thus identify the particular character that the user intended to input when the key was pressed. Hence, after the ambiguous key has been identified 454, a set of possible characters (reference patterns) is selected 456 based on the identified ambiguous key. Here, the possible characters are able to be limited based on the identified ambiguous key. For example, in the case when the ambiguous key is associated with the characters of "3", "D", "E", "F", then the set of possible characters can be limited to those possible characters (reference patterns) that pertain to voice profiles for these same characters. As a result, the computational processing needed to recognize which character the user intended to input is significantly reduced because the vocabulary is limited. After the set of possible characters has been selected 456, the comparison 410 discussed above with respect to FIG. 4A can then be performed using the set of possible characters that have been selected. Such comparison operates to store 414 the matching character in a second buffer. Alternatively, when the decision 452 determines that a key has not been pressed, then operations 454 and 456 are bypassed.

Thereafter, the key selection processing 450 illustrated in FIG. 4B operates to search 458 for a particular character from the second buffer. Here, the particular character can be identified within the second buffer by associating the position within the second buffer with the time in which the key was pressed. In any case, once the search 458 has found the particular character, the particular character can be output 460. The particular character once output 460 can be used in a variety of ways by the computing device associated with the keyboard. For example, the particular character can be displayed on a display screen, be used by operating system or application, or be used to trigger some other function of the computing device. Of course, if the search 458 finds no matching character, then no character would be output. In any case, following the operation 460, the key entry is cleared 462 and then the key selection processing returns to repeat the decision 452 and subsequent operations so that a next key input can be processed.

Figure 4C:
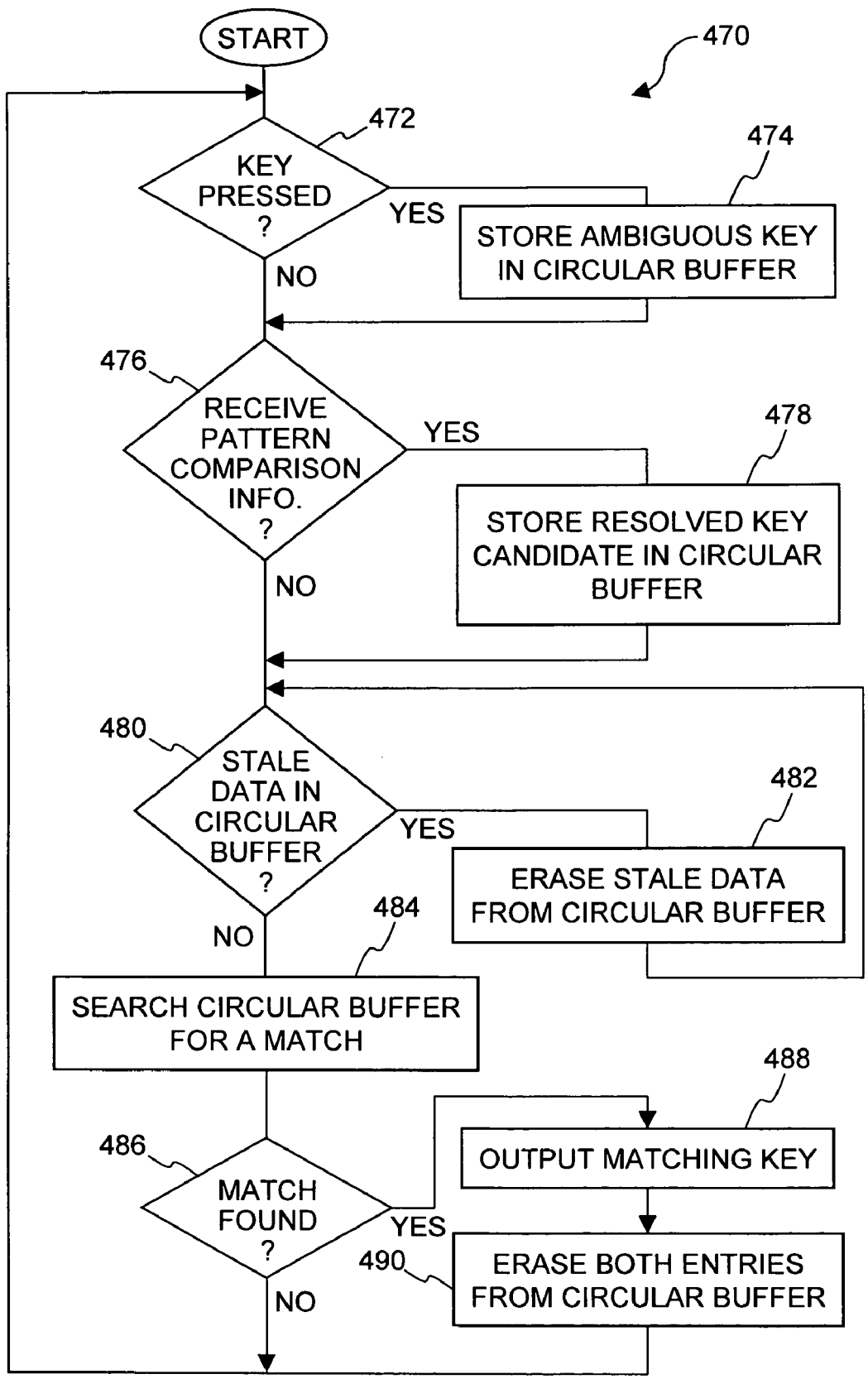
FIG. 4C is a flow diagram of key determination processing according to one embodiment of the invention.

FIG. 4C is a flow diagram of key determination processing 470 according to one embodiment of the invention. The key determination processing 470 continuously operates to receive and process key inputs as well as voice inputs. As an example, the key inputs can be provided by the keyboard 210 and the voice inputs can be provided by the pattern comparison unit 208 illustrated in FIG. 2.

The key determination processing 470 begins with a decision 472 that determines whether a key has been pressed by a user. When the decision 472 indicates that a key (ambiguous key) has been pressed, then the ambiguous key is stored 474 in a circular queue. Here, the key that has been pressed is associated with an ambiguous key input (e.g., a single key press) that does not fully disambiguate the key that the user intends to input. Following the storing operation 474, if performed, or directly following the decision 472 when a key has not been pressed, a decision 476 determines whether pattern comparison information has been received. The pattern comparison information is information about how well a processed voice input compares to reference patterns. The pattern comparison information results from the voice input being compared to reference patterns that are associated with the key pressed. In one implementation, the set of reference patterns considered for this comparison operation is limited by the last key pressed. The pattern comparison between the voice input and the reference patterns thus serves to identify a resolved key candidate. When the decision 476 determines that pattern comparison information has been received, the resolved key candidate that is identified by the pattern comparison is stored 478 in a circular buffer. The circular buffer can be the same or different from the circular buffer storing the ambiguous key entries. Since the processing and hardware of the device performing the comparison is limited and various input timing issues (such as when the key is pressed and when a voice input is supplied) have an impact, the resolved key candidate is not necessarily the key that the user desires to input. Following the operation 478, if performed, as well as directly following the decision 476 when pattern comparison information is not received, a decision 480 determines whether data in the circular buffer is stale. As an example, data stored in the circular buffer that is older than one second can be removed from the circular buffer, thus purging data from the circular buffer that should not be considered. Hence, when the decision 480 determines that data in the circular buffer is stale, the stale data is erased 482 from the circular buffer. After erasing 482 the stale data, the key determination processing 470 returns to repeat the decision 480 and subsequent blocks.

On the other hand, when the decision 480 determines that the data in the circular buffer is not stale, then the circular buffer is searched 484 for a match. Here, a match would be determined by comparing the ambiguous keys stored in the circular buffer with the resolved key candidates stored in the circular buffer. Again, these can be the same or different circular buffers. A decision 486 then determines whether a match has been found. A match is found when one of the possible characters associated with one of the ambiguous keys matches (or is equal to) one of the resolved key candidates. When a decision 486 determines that a match has been found, the matching key is output 488. Subsequently, both the entries from the circular buffer are erased 490. After the erasure of the entries, the key determination processing 470 returns to repeat the decision 472 and subsequent blocks so that additional key determinations can be made.

Figure 5:
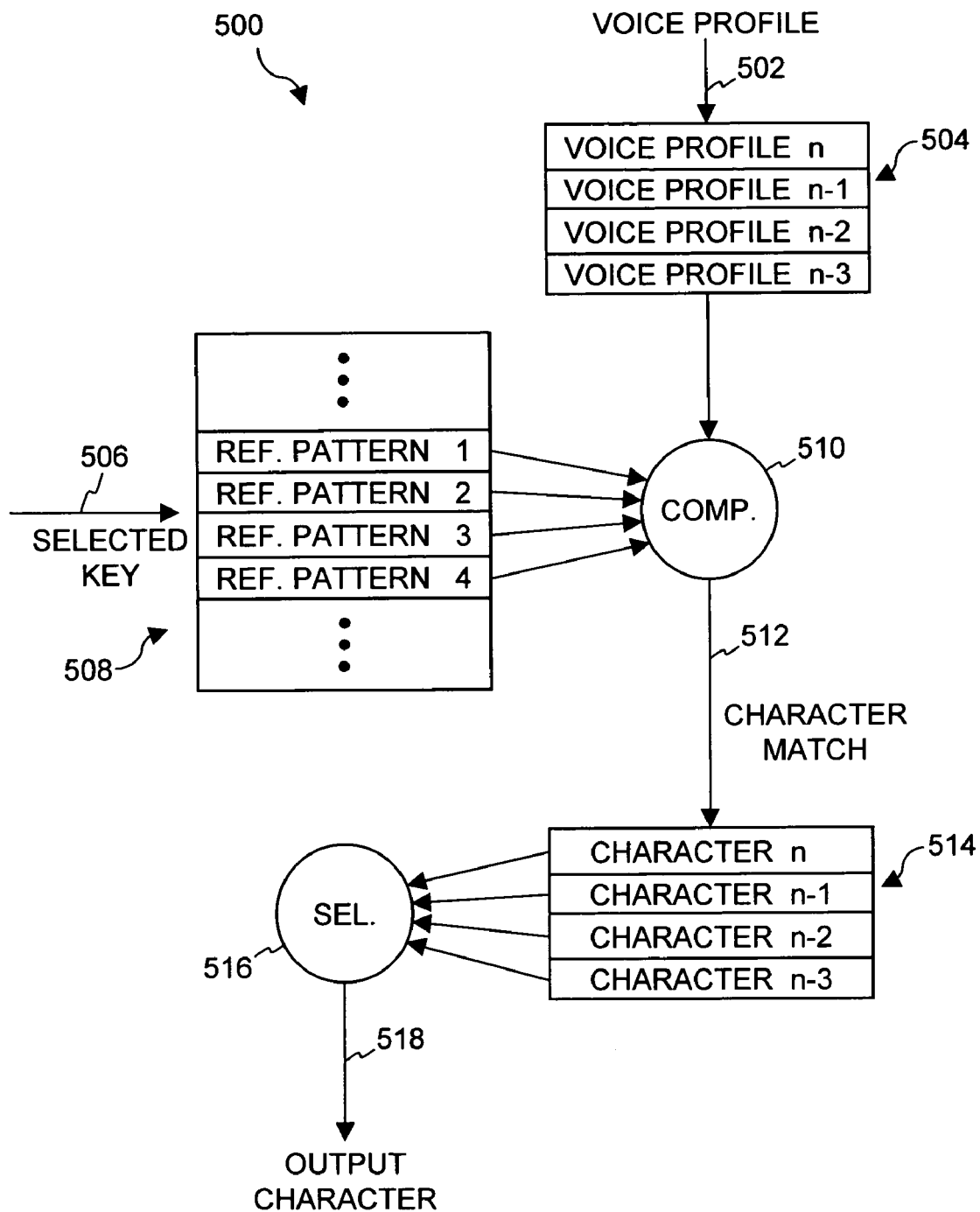
FIG. 5 is a schematic diagram of key disambiguation processing according to one embodiment of the invention.

FIG. 5 is a schematic diagram of key disambiguation processing 500 according to one embodiment of the invention. The key disambiguation processing 500 can, for example, represent an implementation of the key input processing 400 of FIG. 4A and the key selection processing 450 of the FIG. 4B.

The key disambiguation processing 500 receives a voice profile 502. As an example, the voice profile 502 can be provided by the microphone 202, the analog-to-digital converter 204 and the data reduction unit 206 of the key disambiguation system 200 illustrated in FIG. 2. The voice profile 502 is stored in a first circular queue 504. As shown in FIG. 5, the first circular queue 504 includes a series of voice profiles that represents the most recently obtained voice profiles. In the simplified example illustrated in FIG. 5, the first circular queue 504 includes the current voice profile (voice profile-n) and the three previous voice profiles (voice profile n–1, voice profile n–2, and voice profile n–3). In one implementation, the first circular queue 504 will include enough voice profiles to represent the last one-half seconds of sound input, though various other types and sizes of buffering of the sound input can be used.

The key disambiguation processing 500 also receives a selected key 506. The selected key 506 is, for example, obtained from the keyboard 210 alone or together with the keyboard controller 212 illustrated in FIG. 2. The selected key 506 is directed to a reference patterns memory 508. The reference patterns memory 508 includes numerous reference patterns (reference sound patterns). However, for any given selected key 506, a subset of the reference patterns is utilized by the key disambiguation processing 500. Namely, when the selected key 506 is received, a reduced set of reference patterns represented in FIG. 5 by reference pattern 1, reference pattern 2, reference pattern 3, and reference pattern 4 are selected. Other reference patterns within the reference patterns memory 508 are unselected and therefor not utilized. The selected reference patterns are directed to a comparator 510. The comparator 510 also receives the voice profiles stored in the first circular queue 504, though typically only one at a time is used. The comparator 510 compares the received voice profiles with each of the reference patterns within the set of selected reference patterns to determine whether there are character matches. The output of the computer 510 is a character match 512. The character match 512 is directed to a second circular queue 514. For example, the comparator 510 will compare the voice profile n against each of the selected reference patterns, and outputs a character match 512, if any, to be stored in the second circular queue 514 as the character n entry. Similarly, the voice profile n–1 is compared against the selected reference patterns by the comparator 510 and a character match 512, if any, is stored as the character n–1 entry of the second circular queue 514. The other voice profiles within the first circular queue 504 are similarly compared against the set of reference patterns and character matches, if any, are stored in the second circular queue 514 as character n–2 and character n–3 entries, respectively. Further, in cases in which the comparator 510 determines that none of the selected patterns match a particular voice profile, the character match 512 can contain a no match signal.

The key disambiguation processing 500 also includes a selector 516. The selector 516 operates to select one of the character entries within the second circular queue 514 to be output as an output character 518. The selector 516 in one embodiment is synchronized with the selection of the selected key 516 such that the timing of the selection can be controlled. The timing of the selection by the selector 516 with the selection of the selected key 506 is utilized to point to the appropriate entry within the second circular queue 514. In one embodiment, the second circular queue 514 is able to store entries corresponding to about one second of data, though various other types and sizes of buffering can be used. With respect to the timing, the selector 516 selects the most approximate entry within the second circular queue 514 and declares such to be the output character. Since some of the entries within the second circular queue 514 may indicate a no match situation, the selector 516 can also scan the second circular queue forwards and backwards (from the most appropriate entry) to locate the most approximate character. By synchronizing the selector 516 with the selection of the select key 506, the key disambiguation processing 500 compensates for a lack of precision by the user with respect to the pressing of a key and vocalization of the character the user intends to enter.

As an example of a representative input sequence, suppose the user wanted to enter "HELLOWORLD" into a constrained data entry computing system. Initially, the user would first press the "4" key and at the same time vocalizes the particular character intended to be entered (i.e., H). To enter the second character, the user would press the "3" key and at the same time vocalizes the particular character intended to be entered (i.e., E). The process repeats for each of the subsequent characters in a like manner as shown in Table II below.

TABLE II

| User Presses This Key | At The Same Moment User Says |
|---|---|
| 4(GHI) | "H" |
| 3(DEF) | "E" |
| 5(JKL) | "L" |
| 6(MNO) | "O" |
| 9(WXYZ) | "W" |
| 6(MNO) | "O" |
| 7(PQRS) | "R" |
| 5(JKL) | "L" |
| 3(DEF) | "D" |

Note that by using a sound input (i.e., voice input), the user only needs to enter a single stroke of an ambiguous key to enter a character.

Additional details on mobile communication devices and constrained input devices can be found in U.S. Pat. No. 5,809,415 which is hereby incorporated by reference.

The invention can be implemented in hardware, software or a combination of hardware and software. The invention can also be embodied as computer readable code on a computer readable medium. The computer readable medium is any data storage device that can store data which can be thereafter be read by a computer system. Examples of the computer readable media include read-only memory, random-access memory, CD-ROMs, magnetic tape, optical data storage devices, carrier waves. The computer readable medium can also be distributed over a network coupled computer systems so that the computer readable code is stored and executed in a distributed fashion.

The advantages of the invention are numerous. Different embodiments or implementations may yield one or more of the following advantages. One advantage of the invention is that voice recognition is used in conjunction with key entries to disambiguate an otherwise ambiguous key entries. Another advantage of the invention is that voice recognition is able to be constrained so that the limited resources of constrained computing devices are sufficient. Still another advantage of the invention is that it is not limited to entering text for words but is applicable to any character entries. Yet another advantage of the invention is that a user need not focus on a display screen to enter characters.

The many features and advantages of the present invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for inputting data in a character-by-character manner to a mobile communication device having a constrained keyboard with ambiguous keys, the mobile communication device also having a microphone for picking up voice input, said method comprising:

(a) receiving voice input from a user using the microphone, the voice input pertaining to a single character;

(b) detecting, substantially concurrently with said receiving (a), that one of the ambiguous keys of the keyboard has been selected by the user as a selected key, the selected key having a plurality of characters associated therewith;

(c) obtaining reference patterns associated with the selected key, the reference patterns being a set of predetermined reference patterns selected from a plurality of reference patterns based on the selected key;

(d) comparing the voice input with the obtained reference patterns to produce comparison data; and (e) identifying a character that was intended to be input by the user based on the comparison data, said identifying (e) of the character that was intended to be input by the user includes at least (e1) determining whether one of the obtained reference patterns matches the voice input based on the comparison data, and (e2) selecting the character from the plurality of the characters associated with the selected key in accordance with the determined one of the obtained reference patterns, wherein said identifying (e) is synchronized with the detection of the selected key by said detecting (b), and wherein the obtained reference patterns are speech reference patterns.

2. A method as recited in claim 1, wherein said obtaining (c), said comparing (d) and said identifying (e) are initiated with the detection of the selected key by said detecting (b).

3. A method as recited in claim 1, wherein the selected key has a plurality of characters associated therewith, and wherein the character identified is one of the plurality of the characters associated with the selected key.

4. A method as recited in claim 3, wherein each one of the obtained reference patterns pertains to one of the plurality of characters associated with the selected key.

5. A method as recited in claim 1, wherein the characters comprise letters or numeric characters.

6. A method as recited in claim 1, wherein said receiving (a) of the voice input is provided by the user without prompting the user to provide a voice input.

7. A method as recited in claim 1, wherein the mobile communication device further has a circular buffer, and wherein the circular buffer is used in said identifying (e) of the character that was intended to be input by the user by being synchronized with the detection of the selected key by said detecting (b).

8. A computer readable medium having program code for disambiguating a key selection to a constrained input keyboard of a computing device, the key selection being ambiguous as to which a plurality of characters is to be input, said computer readable medium comprising:

program code for detecting whether an ambiguous key of the keyboard has been selected as a selected key;

program code for receiving a voice input corresponding to a single one of the characters associated with the selected key, the voice input being received substantially concurrently with the detection of the selected key; and program code for determining the one of the characters that has been input based on the selected key and the voice input, said program code for determining includes at least program code for obtaining reference patterns associated with the selected key;

program code for comparing the voice input with the obtained reference patterns to produce comparison data; and program code for identifying the one of the characters that has been input based on the comparison data, and wherein said program code for obtaining, said program code for comparing and said program code for identifying are initiated with the detection of the selected key by said program code for detecting.

9. A computer readable medium as recited in claim 8, wherein the computing device is a mobile computing device having the constrained input keyboard integral thereto.

10. A computer readable medium as recited in claim 9, wherein said program code for receiving of the voice input is provided by a user without prompting the user to provide a voice input.

11. A computer readable medium as recited in claim 9, wherein the computing device is a mobile telephone.

12. A computer readable medium as recited in claim 8, wherein the selected key has a plurality of characters associated therewith, and wherein the character identified is one of the plurality of the characters associated with the selected key.

13. A computer readable medium as recited in claim 12, wherein the computing device is a mobile computing device having the constrained input keyboard integral thereto.

14. A computer readable medium as recited in claim 13, wherein the computing device is a mobile telephone.

15. A computer readable medium as recited in claim 8, wherein the mobile computing device has a circular buffer, and wherein the circular buffer is used in by said program code for identifying the character that was intended to be input by the user by being synchronized with the detection of the selected key.

16. A key disambiguate system for an ambiguous key input device having a plurality of keys, with each key representing a plurality of different characters, wherein the improvement comprises completely disambiguating a user's key input of a single action on a single one of the keys through use of a user's sound input pertaining to an intended character associated with the single one of the keys.

17. A key disambiguate system as recited in claim 16, wherein the user's sound input is received substantially simultaneously with the user's key input, and wherein said key disambiguate system is internal to a mobile telephone having the ambiguous key input device.

18. A key disambiguation system, comprising:

a microphone for picking up an analog voice input;

an analog-to-digital converter coupled to said microphone, said analog-to-digital microphone converts the analog voice input to a digital voice input;

a data reduction unit coupled to said analog-to-digital circuit, said data reduction unit identifies distinguishing characteristics within the digital voice input as processed voice input;

an ambiguous key input device having a plurality of keys, each of the keys representing a plurality of different characters;

a keyboard controller coupled to said ambiguous key input device, said keyboard controller detects a user's selection of one of the keys of said ambiguous key input device and invokes a key selection event;

a reference sound patterns source coupled to said keyboard controller, said reference sound patterns source stores a plurality of reference sounds;

a pattern comparison unit coupled to said data reduction unit and said reference sound patterns source, said pattern comparison unit operates to compare the processed voice input with selected ones of the reference sound patterns to produce comparison data; and a key determination unit coupled to said pattern comparison unit, said key determination unit operates in response to the key selection event to determine the one of the characters being input based on the comparison data.

19. A key disambiguation system as recited in claim 18, wherein said key determination unit identifies a matching one of the selected reference sound patterns, and determines the one of the characters being input from the matching of the selected reference sound patterns.

20. A key disambiguation system as recited in claim 18, wherein said key determination unit includes at least a circular buffer.

21. A mobile communication device having a constrained keyboard with ambiguous keys in a character-by-character manner, said method comprising:

a microphone configured to receive voice input from a user, the voice input pertaining to a single character;

means for detecting, substantially concurrently with the receipt of the voice input via said microphone, that one of the ambiguous keys of the keyboard has been selected by the user as a selected key;

means for obtaining reference patterns associated with the selected key;

means for comparing the voice input with the obtained reference patterns to produce comparison data; and means for identifying a single character that was intended to be input by the user based on the comparison data.

22. A method for inputting data to a mobile communication device having a constrained keyboard with ambiguous keys, the mobile communication device also having a microphone for picking up voice input, said method comprising:

(a) receiving user inputs, the user inputs including a voice input from a user using the microphone and a key selection of at least a single one of the ambiguous keys of the keyboard, the key selection has a plurality of characters associated therewith, the voice input pertaining to a single character corresponding to the key selection, and the voice input and the key selection being received substantially simultaneously;

(b) obtaining reference patterns associated with the key selection, the reference patterns being a set of predetermined set of reference patterns selected from a plurality of reference patterns based on the key selection;

(c) comparing the voice input with the obtained reference patterns to produce comparison data; and (d) identifying a single character that was intended to be input by the user based on the comparison data, said identifying (d) of the character that was intended to be input by the user includes at least (d1) determining whether one of the obtained reference patterns matches the voice input based on the comparison data; and (d2) selecting the character from the plurality of the characters associated with the key selection in accordance with the determined one of the obtained reference patterns, wherein said identifying (d) is synchronized with the detection of the key selection, and wherein the obtained reference patters are speech reference patterns.

23. A method as recited in claim 22, wherein the key selection has a plurality of characters associated therewith, and wherein the character identified is one of the plurality of the characters associated with the key selection.

24. A method as recited in claim 23, wherein each one of the obtained reference patterns pertains to one of the plurality of characters associated with the key selection.

25. A method as recited in claim 22, wherein the mobile communication device further has a circular buffer, and wherein the circular buffer is used in said identifying (d) of the single character that was intended to be input by the user by being synchronized with the detection of the selected key by said detecting (b).

\* \* \* \* \*

UNITED STATES PATENT AND TRADEMARK OFFICE
CERTIFICATE OF CORRECTION

PATENT NO.         : 7,143,043 B1                                      Page 1 of 1
APPLICATION NO. : 09/558900
DATED                 : November 28, 2006
INVENTOR(S)       : Tom R. Vandermeijden It is certified that error appears in the above-identified patent and that said Letters Patent is hereby corrected as shown below:

On the title page: in the final sentence of the Abstract (Item 57), please remove the comma after "Examples".

At column 1, line 61, please remove the comma after "including".

At column 3, line 62, please replace "utilized" with --utilize--.

At column 4, line 27, please delete "to".

At column 5, line 20, please replace "includes" with --include--.

At column 6, line 32, please replace "produced" with --produce--.

At column 9, line 28, please replace "therefor" with --therefore--.

At column 12, line 45, claim 15, please delete "in".

At column 14, line 32, claim 22, please replace "patters" with --patterns--.

Signed and Sealed this

Twenty-fourth Day of June, 2008

JON W. DUDAS
*Director of the United States Patent and Trademark Office*